Patented Oct. 9, 1945

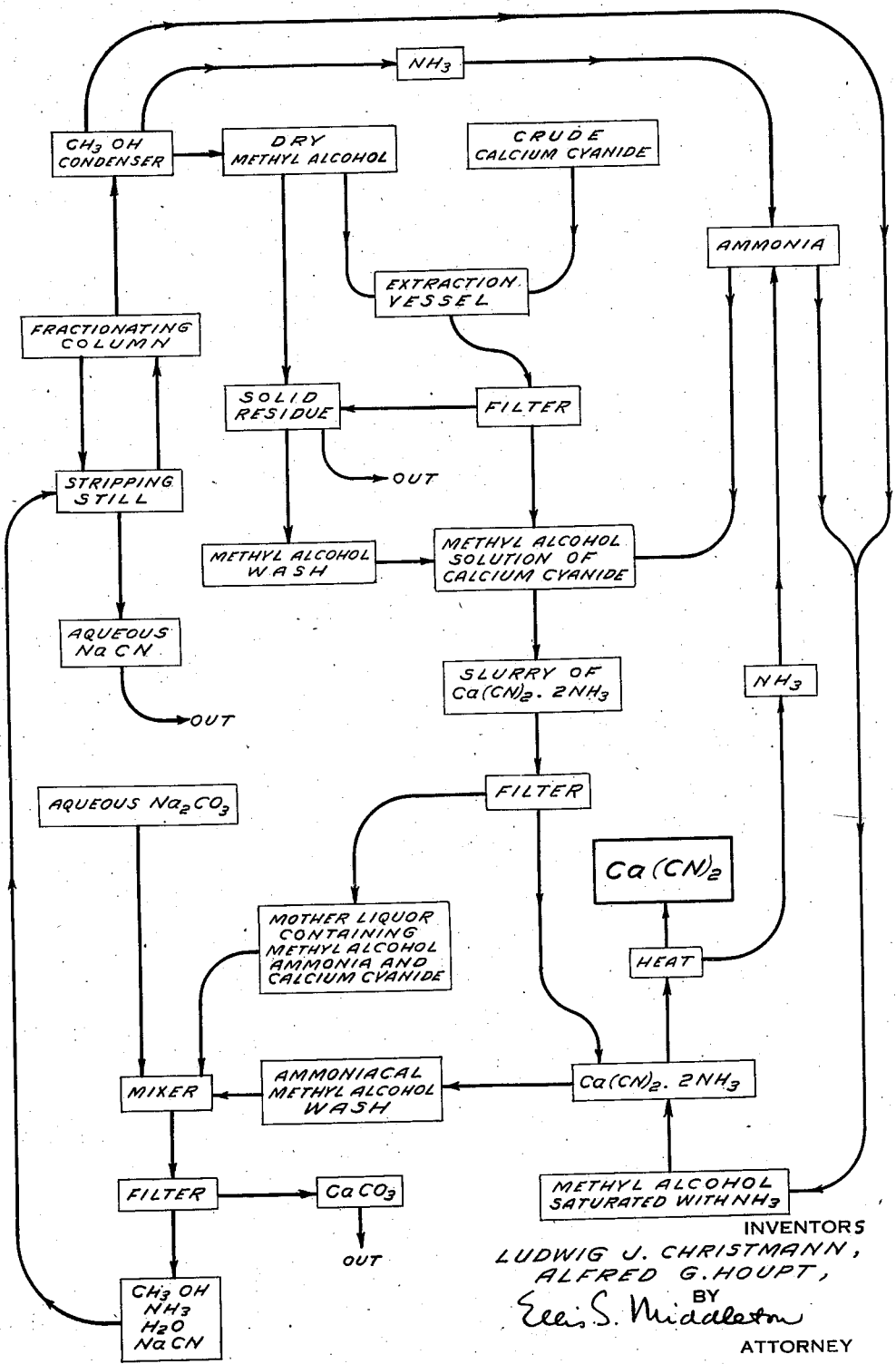

2,386,434

UNITED STATES PATENT OFFICE 2,386,434

METHOD OF PRODUCING HIGH-GRADE CALCIUM CYANIDE

Ludwig J. Christmann, Yonkers, N. Y., and Alfred G. Houpt, Stamford, Conn., assignors to American Cyanamid Company, New York, N. Y., a corporation of Maine Application April 5, 1943, Serial No. 481,908

10 Claims. (Cl. 23—84)

The present invention relates to the production of calcium cyanide, and more particularly to a method of preparing calcium cyanide in a substantially pure form from a crude calcium cyanide.

This compound is particularly valuable in that it is a readily available source of hydrocyanic acid through decomposition when exposed to a moist atmosphere. Consequently, the product is applicable to such uses as fumigation for the control and extermination of insects and allied pests. It is also useful in processes for the extraction of metals from their ores, for the improvement of electrolytic baths and the like.

There is on the market today a crude calcium cyanide known as "Aero-Brand Cyanide," which is a furnace product, obtained by fusion of crude calcium cyanamide, calcium carbide and salt. This product contains in addition to calcium cyanide such impurities as calcium cyanamide, lime, salt, carbide, graphite and minor by-products.

The principal object of this invention is to provide a method whereby calcium cyanide may be readily and cheaply obtained. Another object resides in a method for the production of calcium cyanide requiring only simple equipment with high efficiencies. A further object is the provision of a method for producing a substantially pure calcium cyanide from a crude product containing calcium cyanide. Other objects will appear hereinafter.

It has been found that the above objects may be attained by establishing a cycle of operation which includes the steps of extracting a crude calcium cyanide with an alcohol chosen from the group consisting of methyl and ethyl alcohol, removing the insolubles, precipitating calcium cyanide diammoniate with ammonia, deammoniating the same to produce the desired calcium cyanide and recovering alcohol and/or ammonia for return to the cycle.

A convenient method of carrying out the above cycle of operation is shown in diagrammatic form in the accompanying flow sheet. A suitable source of crude calcium cyanide may be the Aero-Brand Cyanide above referred to, although obviously the invention is not to be restricted to such a source of crude material. Using Aero-Brand Cyanide as a starting material, it is only necessary to extract the same with substantially dry methyl alcohol for a sufficient length of time and in sufficient ratios to obtain a reasonably concentrated solution of calcium cyanide therein. The crude calcium cyanide should be added uniformly and not too rapidly to the charge of methyl alcohol in an extraction vessel equipped with an agitator and cooling coils. The slurry is agitated and cooled, preferably to a temperature below 40° C., as heat is liberated by the dissolution of the crude cyanide in the alcohol. The other ingredients of Aero-Brand Cyanide are substantially insoluble in the alcohol, and consequently upon filtering the slurry, the alcohol solution of calcium cyanide passes through as filtrate, leaving in the cake most of the undesirable impurities. The cake may be washed with methyl alcohol, and the washings added to the filtrate. This concentrated solution of calcium cyanide is a mobile, light straw-colored liquid, which is reasonably stable upon standing, particularly if maintained at low temperatures.

In the preferred form, dry ammonia gas is then introduced into the calcium cyanide solution, whereupon calcium cyanide diammoniate is precipitated as a crystalline, grayish-white, readily filterable solid, having a slight pinkish cast. Due to the comparatively high heat of solution of ammonia in methyl alcohol, cooling of the mixture during the ammoniation is desirable, preferably to a temperature below 35° C., to avoid undue azulmic decomposition and darkening of the liquor.

Dry or substantially anhydrous reagents are preferred in the present method due to the fact that moisture has a tendency to decompose the calcium cyanide with consequent lessening of yields.

Where anhydrous liquid ammonia is available, this material may be used advantageously for the simple reason that its addition at this point tends to maintain a desirably low temperature in the precipitating vessel.

While the use of ammonium hydroxide has a drawback in that it introduces water, yet in the case of concentrated ammonium hydroxide, only small quantities of water would enter the reacting menstruum, which may not cause a sufficient lowering of final yields to be entirely objectionable.

The slurry of calcium cyanide diammoniate is then filtered and the diammoniate may be washed with methyl alcohol saturated with ammonia. When so washed, the combined filtrate and washings containing methyl alcohol, ammonia and residual calcium cyanide are treated with a compound which, through double decomposition with the residual calcium cyanide, forms an insoluble calcium compound and a soluble cyanide. Compounds which may be used for this purpose are carbonates, and in particular, the alkali metal carbonates, e. g. sodium carbonate, which are added to the mother liquor preferably in aqueous solution. The mixture is then filtered to remove the precipitated calcium carbonate. The filtrate is charged into a stripping still equipped with a fractionating column and a condenser. The alcohol and ammonia pass from the fractionating column into the condenser where they are separated and separately returned to the cycle. The aqueous cyanide residue is removed from the still and may be used for specific purposes known in the art.

The calcium cyanide diammoniate is then deammoniated by heating to produce the substantially pure calcium cyanide, and the evolved ammonia returned to the cycle. A temperature of from 200 to 230° C. is required for rapid separation of the ammonia. Temperatures within the range of 180 to 325° C. are feasible. However, care must be taken at the higher temperatures to avoid decomposition of the calcium cyanide. The deammoniation may be carried out by heating the diammoniate under a partial vacuum to avoid the contact of air and particularly moisture, and to facilitate the removal of the evolved ammonia.

A highly important step in the above cycle is the treatment of the mother liquor from the diammoniate precipitation involving the recovery of the alcohol and ammonia reagents. It is important that the recovered alcohol be substantially ammonia-free when returned to the cycle as it has been found that an ammonia content greater than about one per cent greatly impedes the dissolution of the crude calcium cyanide therein. Recycling the mother liquor as such would therefore lessen the efficiency of the process. Furthermore, removal of the ammonia by heating the mother liquor is unsatisfactory as decomposition of the residual calcium cyanide takes place with the formation of black gelatinous materials which greatly hinder the filtration of the alcohol slurry of crude calcium cyanide if this liquor is used in a subsequent extraction cycle. As a consequence, by recovering the cyanide, alcohol and ammonia separately from the mother liquor, interference of one with the other or with the efficient operation of the entire cycle is avoided, while at the same time all values can thus be used in this or other processes.

*Example*

50 parts by weight of Aero-Brand Cyanide, analyzing substantially 46% calcium cyanide, were added slowly with continuous agitation to 250 parts by weight of anhydrous methyl alcohol at a temperature of 20-25° C. Agitation of the slurry was continued for ½ hour after the addition of the crude cyanide. The slurry was filtered and the filter cake washed with dry methyl alcohol. The combined filtrate and washings were treated with dry ammonia gas at a temperature of about 15° C. with continuous agitation. The resulting suspension of calcium cyanide diammoniate crystals was filtered, and the filter cake washed with cold dry methyl alcohol saturated with ammonia. The combined filtrate and wash liquor containing methyl alcohol, ammonia and residual calcium cyanide was treated with a 5% aqueous sodium carbonate solution to convert the calcium cyanide to sodium cyanide. The precipitated calcium carbonate was filtered off and the filtrate charged into a stripping still equipped with a fractionating column and a condenser. The methyl alcohol and ammonia were distilled from the mixture leaving the aqueous sodium cyanide residue in the still. The methyl alcohol was condensed and recovered substantially ammonia-free. The ammonia was subsequently recovered and recycled. The crystalline calcium cyanide diammoniate was heated under a partial vacuum for 3 hours at a temperature of about 220° C., and the evolved ammonia recovered. The remaining product was a pale-gray powder, analyzing 94.2% calcium cyanide.

When ethyl alcohol is used in place of methyl alcohol in the process, a larger quantity will be required due to the lower solubility of the calcium cyanide therein.

The operation as described, affords a reliable and relatively inexpensive process for producing high grade calcium cyanide.

While the invention has been described with particular reference to specific embodiments, it is to be understood that it is not to be limited thereto but is to be construed broadly and restricted solely by the scope of the appended claims.

We claim:

1. A method of producing calcium cyanide which includes the steps of extracting a crude calcium cyanide with an alcohol chosen from the group consisting of methyl and ethyl alcohol, removing the insolubles, adding ammonia to the extract to precipitate calcium cyanide diammoniate, separating the precipitated calcium cyanide diammoniate from the mother liquor containing alcohol, ammonia and residual calcium cyanide, deammoniating the calcium cyanide diammoniate, separating a substantially ammonia-free alcohol from the mother liquor and returning the said alcohol to the cycle.

2. A method of producing calcium cyanide which includes the steps of extracting a crude calcium cyanide with an alcohol chosen from the group consisting of methyl and ethyl alcohol, removing the insolubles, adding ammonia to the extract to precipitate calcium cyanide diammoniate, separating the precipitated calcium cyanide diammoniate from the mother liquor containing alcohol, ammonia and residual calcium cyanide, deammoniating the calcium cyanide diammoniate, separating a substantially ammonia-free alcohol from the mother liquor and returning the said alcohol to the cycle in which prior to the separation of the substantially ammonia-free alcohol, there is added to the mother liquor a compound which through double decomposition with the residual calcium cyanide forms an insoluble calcium compound and a soluble cyanide, and removing the insoluble calcium compound.

3. A method of producing calcium cyanide which includes the steps of extracting a crude calcium cyanide with an alcohol chosen from the group consisting of methyl and ethyl alcohol, removing the insolubles, adding ammonia to the extract to precipitate calcium cyanide diammoniate, separating the precipitated calcium cyanide diammoniate from the mother liquor containing alcohol, ammonia and residual calcium cyanide, deammoniating the calcium cyanide diammoniate, separating a substantially ammonia-free alcohol from the mother liquor and returning the said alcohol to the cycle in which prior to the separation of the substantially ammonia-free alcohol, there is added to the mother liquor an aqueous solution of a carbonate, and removing the precipitated calcium carbonate.

4. A method of producing calcium cyanide which includes the steps of extracting a crude calcium cyanide with an alcohol chosen from the group consisting of methyl and ethyl alcohol, removing the insolubles, adding ammonia to the extract to precipitate calcium cyanide diammoniate, separating the precipitated calcium cyanide diammoniate from the mother liquor containing alcohol, ammonia and residual calcium cyanide, deammoniating the calcium cyanide diammoniate, separating a substantially ammonia-free alcohol from the mother liquor and returning the said alcohol to the cycle in which prior to the separation of the substantially ammonia-free alcohol, there is added to the mother liquor an aqueous solution of sodium carbonate, and removing the precipitated calcium carbonate.

5. A method of producing calcium cyanide which includes the steps of extracting a crude calcium cyanide with an alcohol chosen from the group consisting of methyl and ethyl alcohol, removing the insolubles, adding ammonia to the extract to precipitate calcium cyanide diammoniate, separating the precipitated calcium cyanide diammoniate from the mother liquor containing alcohol, ammonia and residual calcium cyanide, deammoniating the calcium cyanide diammoniate and returning the ammonia therefrom to the cycle, separating a substantially ammonia-free alcohol from the mother liquor and returning the said alcohol to the cycle.

6. A method of producing calcium cyanide which includes the steps of extracting a crude calcium cyanide with an alcohol chosen from the group consisting of methyl and ethyl alcohol, removing the insolubles, adding ammonia to the extract to precipitate calcium cyanide diammoniate, separating the precipitated calcium cyanide diammoniate from the mother liquor containing alcohol, ammonia and residual calcium cyanide, separating a substantially ammonia-free alcohol from the mother liquor and returning the said alcohol to the cycle, deammoniating the calcium cyanide diammoniate, recovering the ammonia from the mother liquor and the deammoniation step and returning the same to the cycle.

7. A method of producing calcium cyanide which includes the steps of extracting a crude calcium cyanide containing impurities substantially insoluble in methyl alcohol with substantially dry methyl alcohol, rejecting the insolubles, precipitating calcium cyanide diammoniate from the extract with substantially dry ammonia, filtering the precipitated calcium cyanide diammoniate from the mother liquor containing methyl alcohol, ammonia and residual calcium cyanide, adding aqueous sodium carbonate to the mother liquor and removing the precipitated calcium carbonate, distilling the methyl alcohol and ammonia from the thus treated mother liquor, recovering the aqueous sodium cyanide from the still residue, and separately returning the methyl alcohol and ammonia to the cycle, heating the calcium cyanide diammoniate under partial vacuum at a temperature of from 200 to 230° C. and returning the evolved ammonia to the cycle.

8. A cyclic method of producing an alkaline earth metal cyanide which includes the following steps, adding ammonia to a solution of an alkaline earth metal cyanide in an alcohol chosen from the group consisting of methyl and ethyl alcohol, to precipitate the alkaline earth metal cyanide diammoniate, separating the diammoniate from the mother liquor, deammoniating the diammoniate, separating a substantially ammonia-free alcohol from the mother liquor and recycling the said alcohol for dissolution of fresh quantities of alkaline earth metal cyanide in which prior to the separation of the substantially ammonia-free alcohol, there is added to the mother liquor an aqueous solution of a compound which through double decomposition with the residual alkaline earth metal cyanide forms an insoluble alkaline earth metal compound and a water soluble cyanide, and removing the insoluble alkaline earth metal compound.

9. A cyclic method of producing an alkaline earth metal cyanide which includes the following steps, adding ammonia to a solution of an alkaline earth metal cyanide in an alcohol chosen from the group consisting of methyl and ethyl alcohol, to precipitate the alkaline earth metal cyanide diammoniate, separating the diammoniate from the mother liquor, deammoniating the diammoniate, separating a substantially ammonia-free alcohol from the mother liquor and recycling the said alcohol for dissolution of fresh quantities of alkaline earth metal cyanide in which prior to the separation of the substantially ammonia-free alcohol, there is added to the mother liquor an aqueous solution of a carbonate, and removing the precipitated alkaline earth metal carbonate.

10. A cyclic method of producing an alkaline earth metal cyanide which includes the following steps, adding ammonia to a solution of an alkaline earth metal cyanide in an alcohol chosen from the group consisting of methyl and ethyl alcohol, to precipitate the alkaline earth metal cyanide diammoniate, separating the diammoniate from the mother liquor, deammoniating the diammoniate, separating a substantially ammonia-free alcohol from the mother liquor and recycling the said alcohol for dissolution of fresh quantities of alkaline earth metal cyanide in which prior to the separation of the substantially ammonia-free alcohol, there is added to the mother liquor an aqueous solution of sodium carbonate, and removing the precipitated alkaline earth metal carbonate.

LUDWIG J. CHRISTMANN.
ALFRED G. HOUPT.